(12) United States Patent
Park et al.

(10) Patent No.: US 6,498,933 B1
(45) Date of Patent: Dec. 24, 2002

(54) METHOD FOR TRANSMITTING DATA FOR INTER-FREQUENCY/INTER-SYSTEM HANDOVER IN MOBILE TELECOMMUNICATIONS SYSTEM

(75) Inventors: Jae Hong Park, Seoul (KR); Chong Won Lee, Seoul (KR); Yeon Sang Koo, Seoul (KR); Shin Hyun Yang, Seoul (KR); Jeong Hwa Ye, Seoul (KR); Yu Ro Lee, Seoul (KR); Ho Geun Lee, Seoul (KR)

(73) Assignee: Hyundai Electronics Inc. Co., Ltd., Kyungki-Do (CN)

( * ) Notice: Subject to any disclaimer, the term of this patent is extended or adjusted under 35 U.S.C. 154(b) by 0 days.

(21) Appl. No.: 09/566,878

(22) Filed: May 8, 2000

(30) Foreign Application Priority Data

Jun. 29, 1999 (KR) ............................................ 99-25282
Mar. 3, 2000 (KR) ........................................ 2000-10687

(51) Int. Cl.[7] ................................................ H04Q 7/00
(52) U.S. Cl. .................... 455/436; 455/438; 370/331
(58) Field of Search ................................ 455/436, 437, 455/438, 439, 440, 442, 444, 450; 370/331, 332

(56) References Cited

U.S. PATENT DOCUMENTS

| | | | |
|---|---|---|---|
| 5,101,501 A | | 3/1992 | Gilhousen et al. ............ 455/436 |
| 5,627,830 A | * | 5/1997 | Kotzin ........................ 370/350 |
| 5,640,679 A | | 6/1997 | Lundqvist et al. ........... 455/436 |
| 5,649,000 A | | 7/1997 | Lee et al. ................... 455/436 |
| 6,308,066 B1 | * | 10/2001 | Rata et al. .................. 455/437 |

\* cited by examiner

Primary Examiner—Thanh Cong Le
(74) Attorney, Agent, or Firm—Bryan Cave LLP

(57) ABSTRACT

A method for transmitting data for inter-frequency/inter-system handover in an asynchronous UTRA mobile telecommunications system, wherein information incapable of being transmitted for an idle period is transmitted over a common channel in the case of the inter-frequency handover or inter-system handover, thereby increasing the quality of speech and more efficiently performing the handover. A base station assigns a common channel to a mobile station connected thereto if inter-frequency (inter-system) handover is requested by the mobile station. Then, the base station transmits information about the assigned common channel to the mobile station and determines whether a transmission frame is an idle frame. The base station transmits data to the mobile station over a dedicated channel if the transmission frame is not the idle frame and over both the dedicated channel and common channel if the transmission frame is the idle frame. If a received frame is the idle frame during data reception, the mobile station receives data from the base station over both the dedicated channel and common channel. Therefore, the present invention has the effect of overcoming a conventional code shortage problem and, because of the assignment of one OVSF code to a common channel, keeping orthogonality with other channels.

16 Claims, 11 Drawing Sheets

METHOD FOR TRANSMITTING DATA FOR INTER-FREQUENCY/INTER-SYSTEM HANDOVER IN MOBILE TELECOMMUNICATIONS SYSTEM

BACKGROUND OF THE INVENTION

1. Field of the Invention

The present invention relates in general to the transmission of data (containing control signals) for handover in mobile telecommunications systems such as a next-generation mobile telecommunications system [international mobile telecommunications-2000 (IMT-2000) system], personal communication service system (PCS) and digital cellular system (DCS), and more particularly to a method for transmitting data for inter-frequency/inter-system handover in an asynchronous mobile telecommunications system of a universal mobile telecommunications system (UMTS) terrestrial radio access (UTRA) type, in which information incapable of being transmitted for an idle period is transmitted over a common channel in the case of the inter-frequency handover or inter-system handover, thereby increasing the quality of speech and more efficiently performing the handover.

2. Description of the Prior Art

FIG. 1 is a view showing an architecture of a conventional asynchronous mobile telecommunications system. As shown in this drawing, the asynchronous mobile telecommunications system comprises an asynchronous terminal 21, a UTRA network (UTRAN) 22 which is an asynchronous radio network including a base station and radio network controller (RNC), and an asynchronous core network 23 connected to the UTRAN 22.

The asynchronous core network 23 includes an asynchronous mobile services switching center (MSC) 24 connected to the UTRAN 22, and a global system for mobile communications-mobile application part (GSM-MAP) network 25 connected to the asynchronous MSC 24.

In the conventional asynchronous mobile telecommunications system with the above-mentioned architecture, the asynchronous terminal 21 receives a system information message from the UTRAN 22 over a broadcast control channel (BCCH) and acquires from the received system information message information necessary to its connection to the asynchronous core network 23, including information related to the asynchronous core network 23 and information about the UTRAN 22.

On the other hand, in the above-mentioned asynchronous UTRA mobile telecommunications system, communication between a mobile station and a base station can be classified into a normal mode and a compressed mode in consideration of inter-frequency handover or inter-system handover. In the normal mode, because there is no possibility that the inter-frequency handover or inter-system handover will occur, a mobile station transmits and receives data to/from a base station to which it is currently connected. FIG. 2 is a view illustrating a state of data transmitted from the base station to the mobile station in the normal mode. As shown in FIG. 2, data are normally transmitted respectively to first and second users User#1 and User#2 in the normal mode.

The compressed mode signifies an interval from an inter-frequency handover (inter-system handover) possibility determination point of time to a point of time where the handover actually occurs. For this interval, while continuously communicating with a currently connected base station, a mobile station monitors an adjacent base station with a different frequency and reports the monitored result to the currently connected base station. At this time, the mobile station must empty a portion of a period for the data transmission to the currently connected base station in order to monitor the adjacent base station with the different frequency. Further, the currently connected base station must transmit information belonging to such a portion, or gap, to the mobile station for a period where it is connected to the mobile station. A separate technique is required to allow the currently connected base station to additionally transmit data belonging to the above portion (gap). Several examples of such a technique are shown in FIGS. 3 to 5.

FIG. 3 is a view illustrating a conventional method where a base station scales a spreading factor down to ½ and transmits data to a mobile station according to the scaled-down spreading factor in the compressed mode. In this method, the base station doubles transmission power to maintain the same quality of service (QoS) as that prior to the compressed mode. Further, the base station can vary the position of an idle period within a frame transmission period of 10 ms. For example, the idle period may be placed in the middle of the frame transmission period as shown in FIG. 3.

However, the above-mentioned method has a disadvantage in that the number of codes useable by the base station is reduced, namely, a code shortage problem.

In other words, codes used in the base station are orthogonal variable spreading factor (OVSF) codes, which are tree-structured as shown in FIG. 6.

In order to maintain the property of the OVSF codes, or orthogonality, a given OVSF code and an OVSF code at a lower branch thereof should not be used at the same time, which will hereinafter be mentioned in more detail with reference to FIG. 6.

Assume that a mobile station of SF=4 enters the base station under the condition that an initial mobile station of SF=2 is assigned with an OVSF code $C_{ch,2,0}$. In this case, an OVSF code assignable to the mobile station of SF=4 is any one of either $C_{ch,4,2}$ or $C_{ch,4,3}$, because the use of an OVSF code at a lower branch of the previously used OVSF code $C_{ch,2,0}$ breaks the orthogonality with other mobile stations.

The above description has been given as an example, and it is prescribed in a proposed standard that spreading factors (SFs) useable for the data transmission from the base station to mobile stations should range from 4 to 512.

Herein, the scale-down of an SF to ½ is realized by compressing and transmitting data on the basis of SF=4 for an idle frame period on the assumption that a mobile station of SF=8 enters the compressed mode. Provided that an OVSF code assigned to the mobile station of SF=8 is present at a lower branch of an OVSF code $C_{ch,4,0}$, an OVSF code useable for an idle frame will be any one of $C_{ch,4,0,1}$, $C_{ch,4,2}$ and $C_{ch,4,3}$. However, with any one OVSF code selected, OVSF codes at lower branches of the selected OVSF code cannot be used while the selected OVSF code is used, resulting in a drain on code resources.

Such a drain on code resources, in turn, leads to a shortage in the number of codes to be assigned to other users on a forward link. In order to solve this code shortage problem resulting from the scale-down of a processing gain to ½, there has been used a non-orthogonal code set of scrambling codes as shown in FIG. 4. Namely, a separate code generator generates non-orthogonal codes, which are then inserted and transmitted to a mobile station for the idle period.

However, the use of the above non-orthogonal code set also encounters problems such as an increase in transmission power resulting from a scale-down of a spreading factor of a slotted frame, an increase in interference with other base station channels due to non-orthogonality and a need for an additional code generator for generating the non-orthogonal code set.

FIG. 5 shows another conventional approach to the code shortage problem resulting from the half scale-down of the processing gain as shown in FIG. 3. This method utilizes parallel scrambling codes. That is, for the process of a slotted frame, an OVSF code identical to that in an existing frame is assigned as a primary scrambling code and a scrambling code generated in FIG. 4 is assigned as a secondary scrambling code.

However, the above-mentioned conventional method is disadvantageous in that a separate code generator must additionally be provided to generate OVSF codes and the QoS is degraded due to an imperfect removal of interference resulting from non-orthogonality.

SUMMARY OF THE INVENTION

Therefore, the present invention has been made in view of the above problems, and it is an object of the present invention to provide a method for transmitting data for inter-frequency/inter-system handover in an asynchronous UTRA mobile telecommunications system, in which data incapable of being transmitted for an idle period is transmitted over a common channel in the case of the inter-frequency handover or inter-system handover, thereby increasing the quality of speech and more efficiently performing the handover.

In accordance with the present invention, each mobile station belonging to a specific base station transmits and receives data to/from the base station in a normal mode. Each mobile station attempts inter-frequency handover or inter-system handover for connection to a different base station with a different operating frequency or communication system as needed. The specific base station additionally assigns a dynamic common channel to a mobile station performing the inter-frequency (or inter-system) handover.

In the case where a certain mobile station intends to enter a compressed mode in a given area, the specific base station assigns and uses an OVSF code to a common channel corresponding to that mobile station. In the case where a different mobile station intends to enter the compressed mode, the specific base station determines whether the currently used common channel is available for the different mobile station. If it is determined that the currently used common channel is time-divided and available for the different mobile station, then the specific base station assigns and uses a sub-tree code of the previously assigned OVSF code to that common channel. Unless the currently used common channel is available for the different mobile station, then the specific base station produces and uses a new common channel.

Radio resources (such as an OVSF code, etc.) assigned to a given common channel can be released and put to other uses when all mobile stations using that common channel complete the compressed mode.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Generally, inter-frequency (inter-system) handover may be required due to the movement of a mobile station or a specific state of a base station while data is transferred between the mobile station and base station. In this case, the mobile station must effectively receive various measured data from a different base station to which it is to move, under the condition that its continuous data communication with the currently connected base station is secured.

To this end, the present invention supports inter-frequency (inter-system) handover of a plurality of mobile stations belonging to a specific base station using a common channel assigned with one orthogonal variable spreading factor (OVSF) code. FIGS. 7a to 7d are views illustrating a common channel proposed according to the present invention and examples of applications of the common channel to users.

Figure 1:
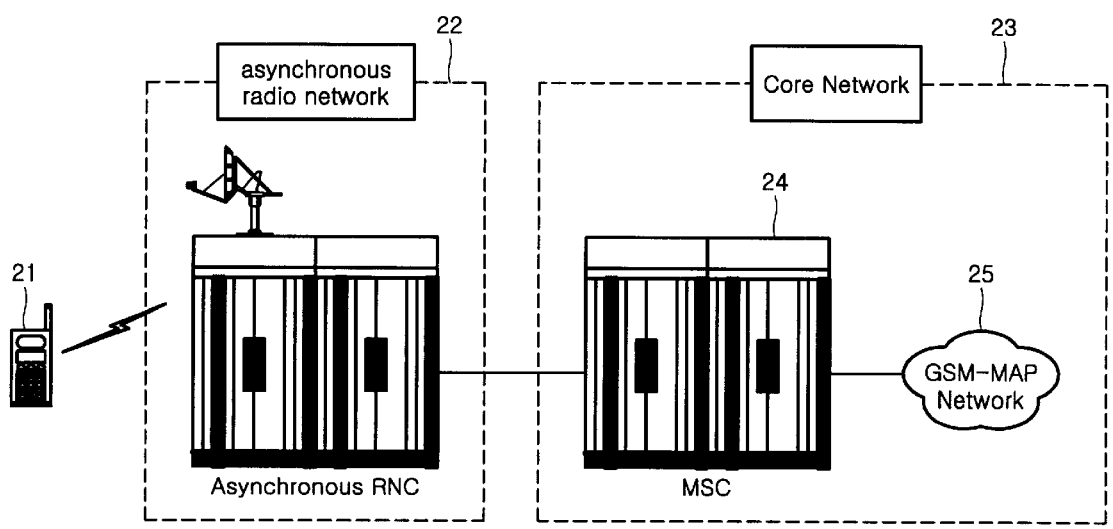
FIG. 1 is a view showing an architecture of a conventional asynchronous mobile telecommunications system.
Figure 2:
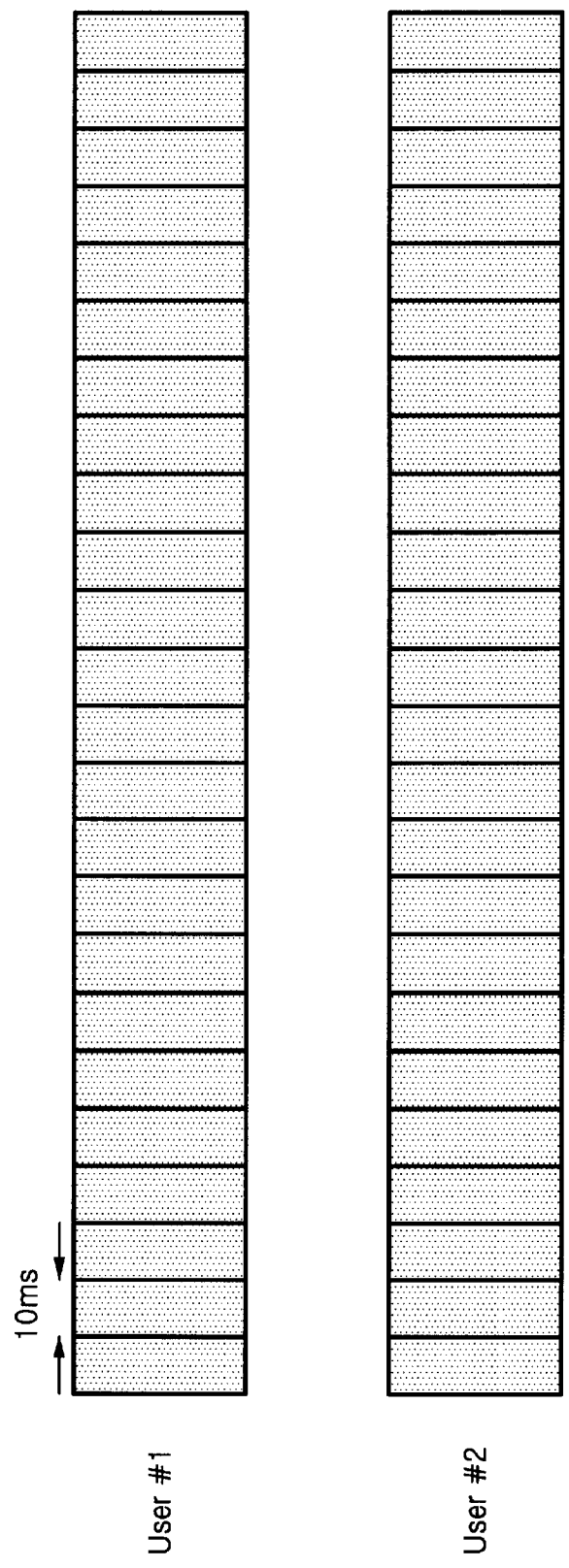
FIG. 2 is a view illustrating a state of data transmitted from a base station to a mobile station in a normal mode in the conventional asynchronous mobile telecommunications system.
Figure 3:
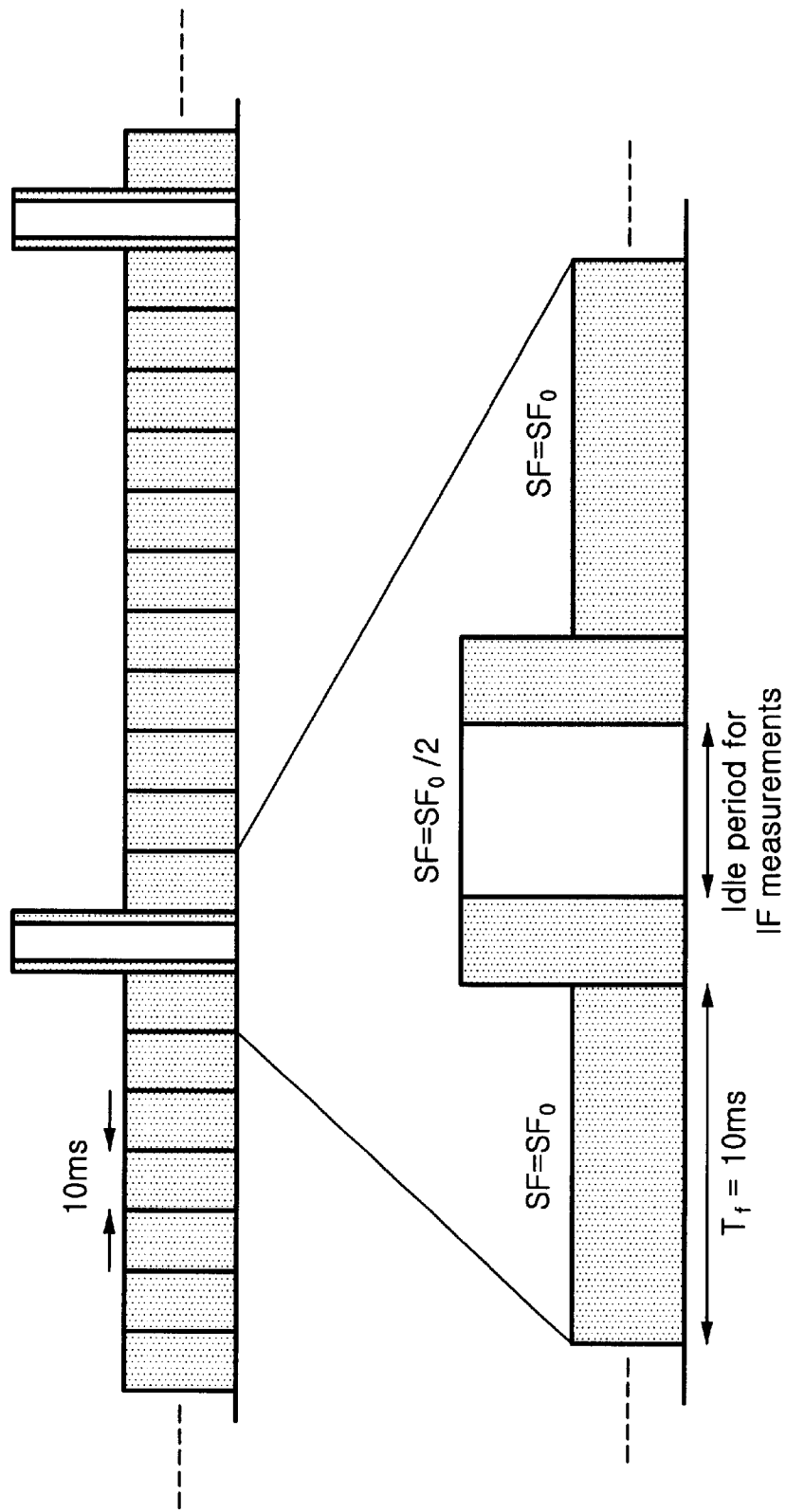
FIG. 3 is a view illustrating a conventional method where a base station scales a spreading factor down to ½ and transmits data to a mobile station according to the scaled-down spreading factor in a compressed mode.
Figure 4:
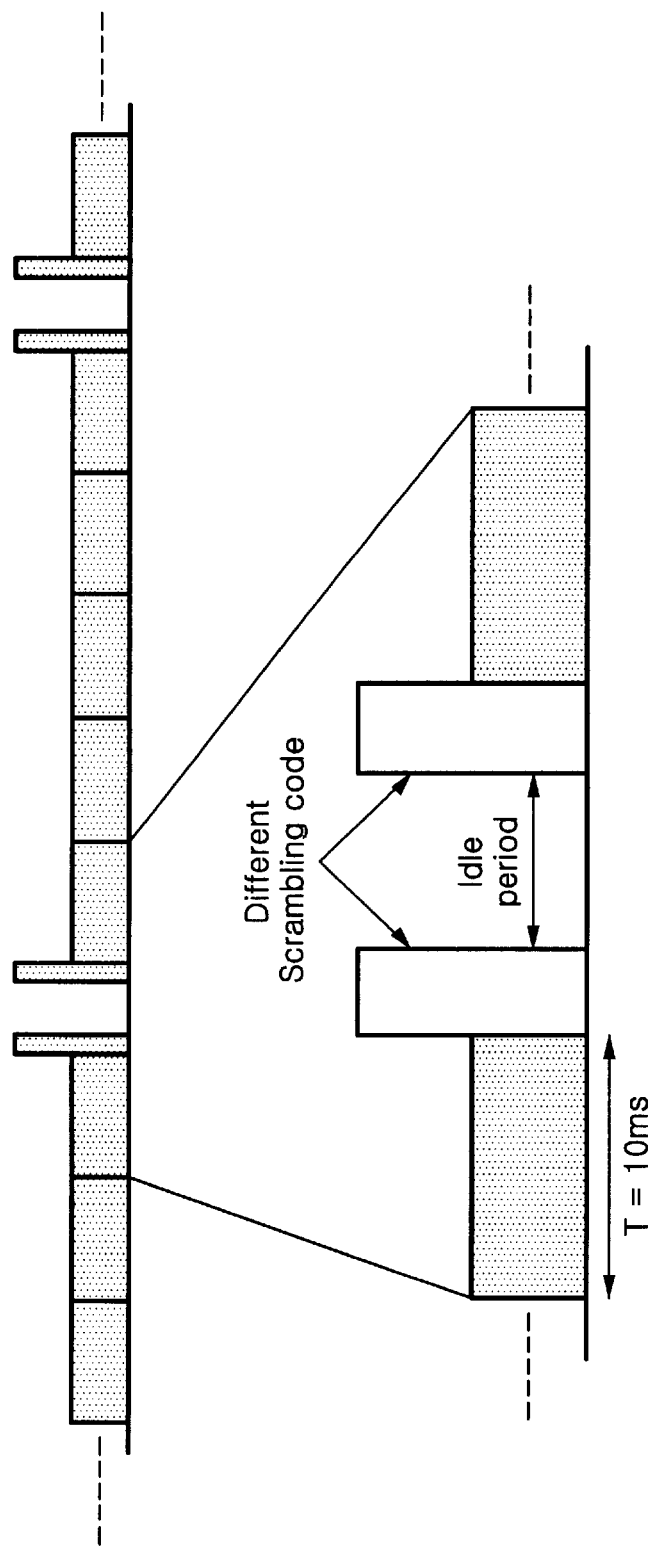
FIG. 4 is a view illustrating a conventional method where a base station transmits data to a mobile station using a non-orthogonal code set in the compressed mode.
Figure 5:
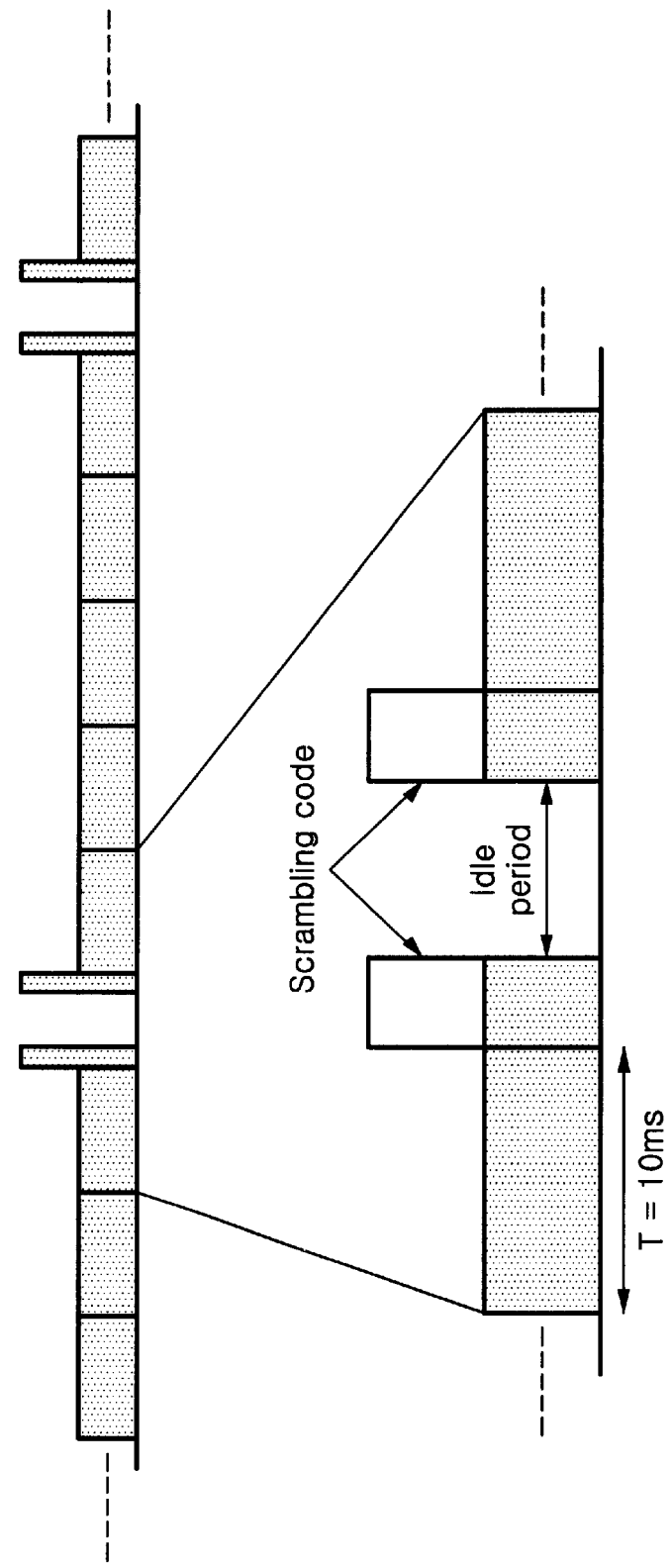
FIG. 5 is a view illustrating a conventional method where a base station transmits data to a mobile station using parallel scrambling codes in the compressed mode.
Figure 6:
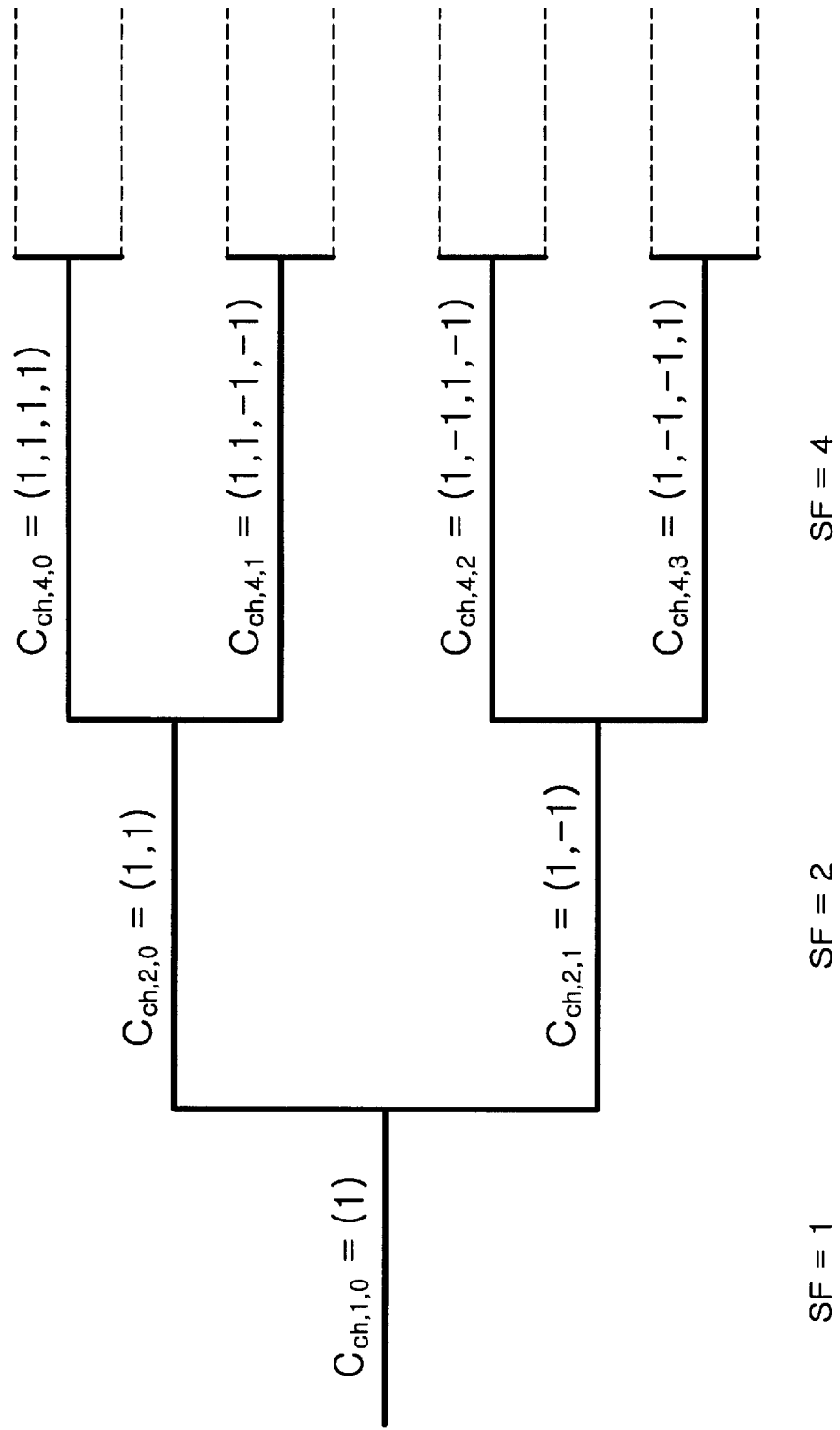
FIG. 6 is a view showing a tree structure of OVSF codes conventionally used in a base station.
Figure 7:
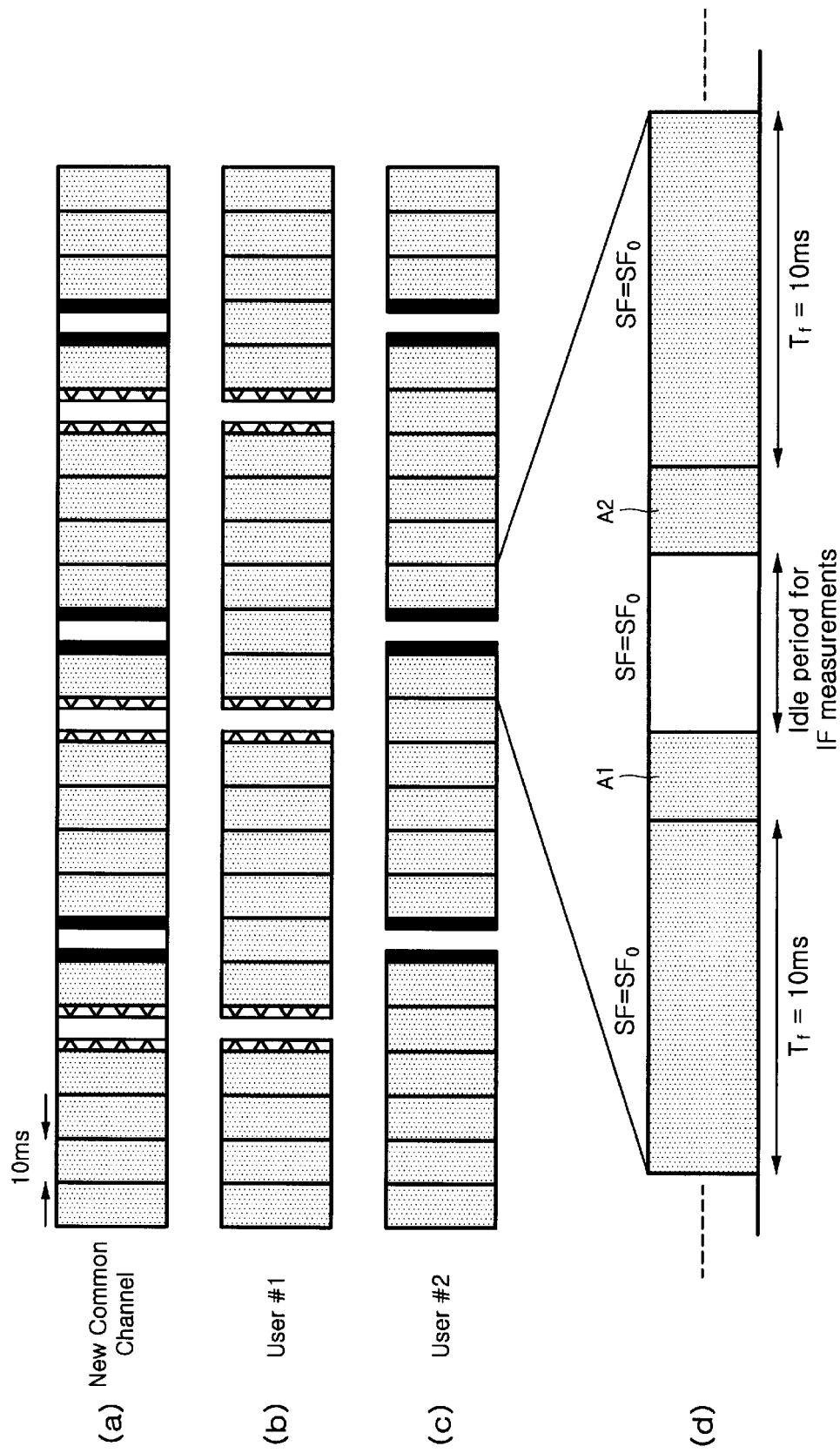
FIGS. 7a to 7d are views illustrating a common channel proposed according to the present invention and examples of applications of the common channel to users.

FIG. 7a shows the presence of a plurality of user idle periods in the common channel proposed according to the present invention, FIG. 7b shows an idle frame and idle period of a first user User#1, FIG. 7c shows an idle frame and idle period of a second user User#2, and FIG. 7d shows the idle period in the idle frame of each user in more detail. Although the idle period of each user is shown in FIG. 7d to be present between active periods A1 and A2 in the associated idle frame for illustrative purpose, a start point thereof is variable within the associated idle frame.

An OVSF code to be assigned to the common channel is pre-determined by a radio resource management function of the upper layer. Upon determining that there is the possibility that inter-frequency (inter-system) handover will occur, a mobile station measures signals from an adjacent base station for n (where, n is an integer greater than or equal to 1) idle periods before performing and completing the handover. Noticeably, a start point of each idle period for the measurement of the signals from the adjacent base station may be present in any slot within the corresponding frame, and an end point thereof may be present in the corresponding frame or the subsequent frame. Further, the upper layer determines information about the start and end points of each idle period and transfers the determined information to a physical layer. Moreover, a base station may use a plurality of scrambling codes.

Now, a description will be given of the preferred embodiments of the present invention to which the above-mentioned concept is applied.

Figure 8:
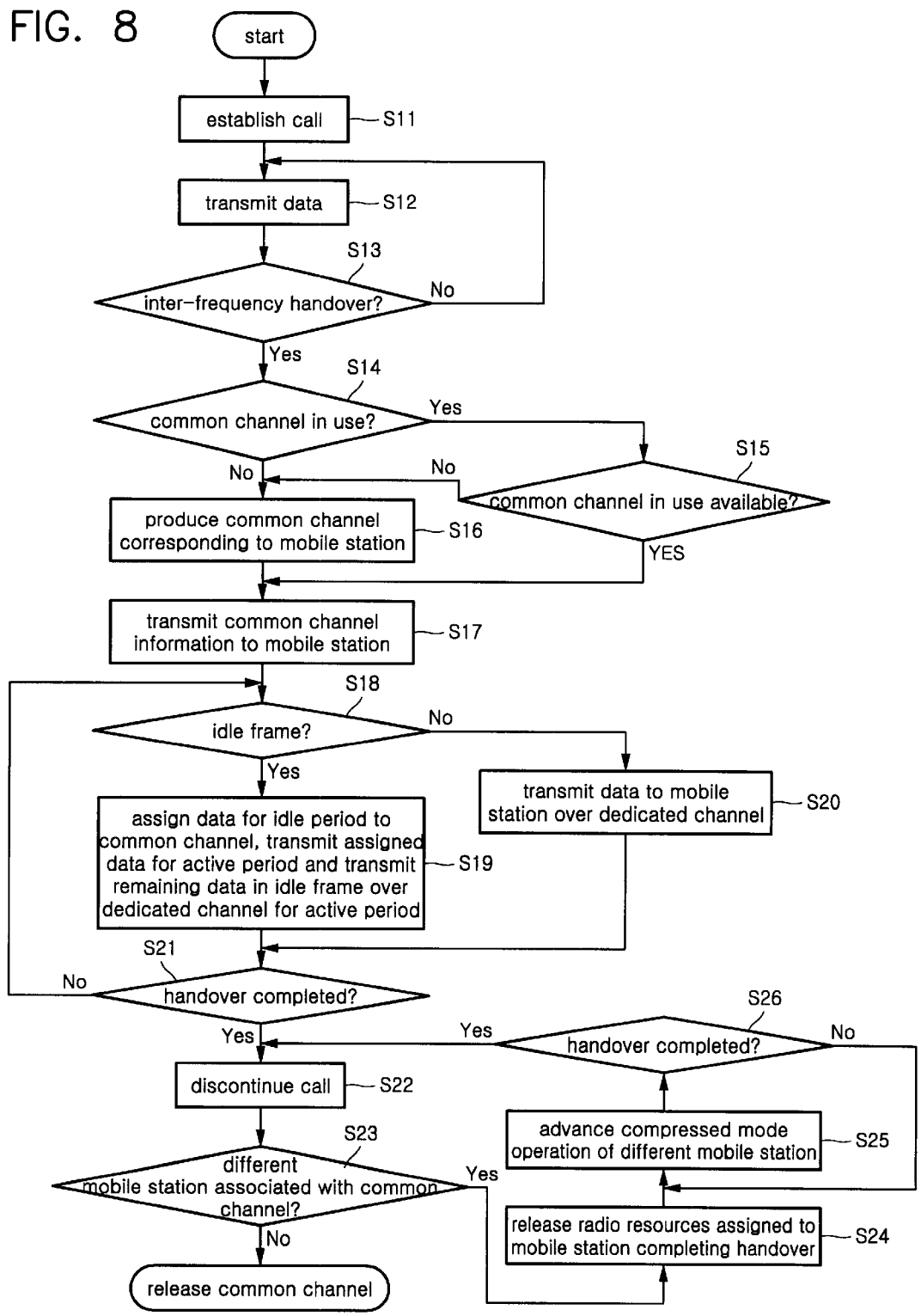
FIG. 8 is a flowchart illustrating a method where a base station transmits data for inter-frequency (inter-system) handover using both the common channel and a dedicated channel in accordance with an embodiment of the present invention.

FIG. 8 is a flowchart illustrating a method where a base station transmits data for inter-frequency (inter-system) handover using both a common channel and dedicated channel in accordance with an embodiment of the present invention.

As shown in FIG. 8, the data transmission method of the base station comprises the first step (S11 and S12) of establishing a call to a given mobile station and then transmitting data to the given mobile station, the second step (S13 and S14) of determining whether the inter-frequency (inter-system) handover is requested during the data transmission and then determining whether a common channel in use is present, if the inter-frequency (inter-system) handover is requested, the third step (S15) of determining whether the common channel in use is divided and available for the given mobile station, if it is determined at the above second step that the common channel in use is present, the fourth step (S16) of producing a common channel corresponding to the given mobile station if it is determined at the above second step that no common channel in use is present or if it is determined at the above third step that the common channel in use is not available for the given mobile station, and the fifth step (S17) of transmitting information about the produced common channel or the common channel in use to the given mobile station. The data transmission method of the base station further comprises the sixth step (S18) of determining whether a transmission frame is an idle frame, after transmitting the common channel information to the given mobile station, the seventh step (S19) of, if it is determined at the above sixth step that the transmission frame is the idle frame, dividing data to be transmitted, assigning data for an idle period in the idle frame to the produced common channel or the common channel in use, transmitting the assigned data to the given mobile station for an active period in the idle frame and transmitting the remaining data in the idle frame to the given mobile station over the dedicated channel for the active period, the eighth step (S20) of transmitting data to the given mobile station over the dedicated channel if it is determined at the above sixth step that the transmission frame is not the idle frame, the ninth step (S21) of determining whether the handover has been completed, after performing the above seventh or eighth step, and the tenth step (S22) of discontinuing the call to the given mobile station if it is determined at the above ninth step that the handover has been completed. The data transmission method of the base station further comprises the eleventh step (S23) of determining whether there is present a different mobile station associated with the produced common channel or the common channel in use, after discontinuing the call to the given mobile station, the twelfth step (S24) of releasing the produced common channel or the common channel in use if it is determined at the above eleventh step that there is not present any mobile station associated with the produced common channel or the common channel in use and only radio resources assigned to the given mobile station if it is determined at the above eleventh step that there is present the different mobile station associated with the produced common channel or the common channel in use, the thirteenth step (S25) of advancing a compressed mode operation of the different mobile station after performing the above twelfth step, and the fourteenth step (S26) of returning to the above tenth step to discontinue a call to the different mobile station, if handover of the different mobile station is completed during the compressed mode operation thereof.

A detailed description will hereinafter be given of the above-mentioned method where the base station transmits data for the inter-frequency (inter-system) handover using both the common channel and dedicated channel in accordance with the preferred embodiment of the present invention.

First, the base station establishes a call to a given mobile station at step S11 and then transmits and receives data to/from the given mobile station over the dedicated channel at step S12.

Subsequently, the base station checks the current state of the given mobile station performing the data communication therewith at step S13 to determine whether the inter-frequency (inter-system) handover is requested. Upon determining at step S13 that the inter-frequency (inter-system) handover is requested, then the base station determines at step S14 whether a common channel in use is present.

In the case where it is determined at the above step S14 that no common channel in use is present, namely, the given mobile station is an initial one entering a compressed mode in the base station, then the base station assigns an OVSF code with the same SF as that used in the above dedicated channel to produce a common channel corresponding to the given mobile station and advances the compressed mode according to the produced common channel at step S16. Then, the base station transmits information about the produced common channel to the given mobile station at step S17.

In the case where it is determined at the above step S14 that the common channel in use is present, namely, it is being used by a different mobile station in the compressed mode, the base station determines at step S15 whether the common channel in use is divided and available for the given mobile station. If the common channel in use is not available for the given mobile station at step S15, the base station proceeds to the above step S16 to produce the common channel corresponding to the given mobile station and then to the above step S17 to transmit the information about the produced common channel to the given mobile station.

If the common channel in use is available for the given mobile station at the above step S15, the base station assigns and uses a sub-tree code of an OVSF code assigned to that common channel and then shifts to the above step S17 to transmit information about that common channel to the given mobile station. Here, the common channel information contains a start point (any one of 16 slots in one frame) and length of an idle period to be used by the given mobile station, which are appropriately determined in consideration of various situations in the base station.

After transmitting the common channel information to the given mobile station, the base station transmits data to that mobile station and meanwhile determines at step S18 whether a transmission frame is an idle frame. If the transmission frame is not the idle frame at step S18, then the base station transmits data to the given mobile station over the dedicated channel at step S20. However, in the case where the transmission frame is the idle frame at step S18, the base station assigns data for an idle period in the idle frame to the produced common channel or the common channel in use and transmits the assigned data to the given mobile station for an active period in the idle frame at step S19. Further, the base station transmits the remaining data in the idle frame to the given mobile station over the dedicated channel for the active period.

Here, the idle period signifies an interval for which a currently connected base station transmits no data to a mobile station to allow the mobile station to monitor an adjacent base station with a different frequency before performing the handover, and the idle frame signifies a frame containing the idle period.

Further, the active period signifies an interval for which the currently connected base station transmits data to the mobile station. After transmitting data to the given mobile station in the above manner, the base station determines at step S21 whether the handover has been completed. If the handover has been completed at step S21, then the base station discontinues the call to the given mobile station at step S22 and determines at step S23 whether there is present a different mobile station associated with the produced common channel or the common channel in use.

In the case where it is determined at the above step S23 that there is not present any mobile station associated with the produced common channel or the common channel in use, the base station releases the produced common channel or the common channel in use. To the contrary, if it is determined at the above step S23 that there is present the different mobile station associated with the produced common channel or the common channel in use, the base station releases only radio resources assigned to the given mobile station at step S24.

Subsequently, the base station advances a compressed mode operation of the different mobile station at step S25 and determines at step S26 whether handover of the different mobile station has been completed during the compressed mode operation thereof. Then, the base station returns to the above step S22 if the handover of the different mobile station has been completed at step S26 and to the above step S25 if it has not been completed at step S26.

Figure 9:
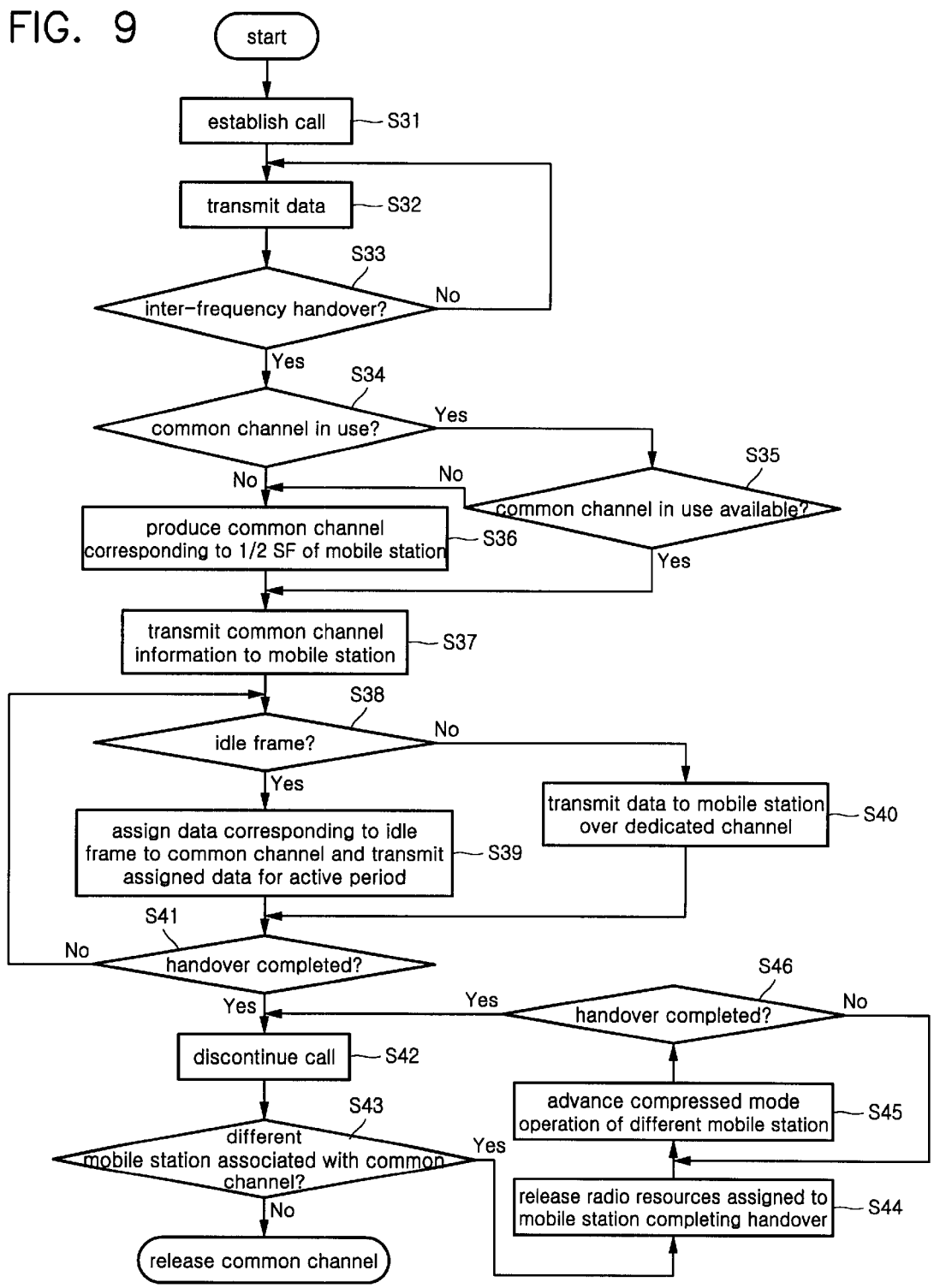
FIG. 9 is a flowchart illustrating a method where a base station transmits data for inter-frequency (inter-system) handover using only the common channel in accordance with an alternative embodiment of the present invention.

FIG. 9 is a flowchart illustrating a method where a base station transmits data for inter-frequency (inter-system) handover using only a common channel in accordance with an alternative embodiment of the present invention.

As shown in FIG. 9, the data transmission method of the base station comprises the first step (S31 and S32) of establishing a call to a given mobile station and then transmitting data to the given mobile station, the second step (S33 and S34) of determining whether the inter-frequency (inter-system) handover is requested during the data transmission and then determining whether a common channel in use is present, if the inter-frequency (inter-system) handover is requested, the third step (S35) of determining whether the common channel in use is divided and available for the given mobile station, if it is determined at the above second step that the common channel in use is present, and the fourth step (S36) of producing a common channel corresponding to ½ an SF of the given mobile station if it is determined at the above second step that no common channel in use is present or if it is determined at the above third step that the common channel in use is not available for the given mobile station. The data transmission method of the base station further comprises the fifth step (S37) of transmitting information about the produced common channel or the common channel in use to the given mobile station, the sixth step (S38) of determining whether a transmission frame is an idle frame, after transmitting the common channel information to the given mobile station, the seventh step (S39) of, if it is determined at the above sixth step that the transmission frame is the idle frame, dividing data to be transmitted, assigning data corresponding to the idle frame to the produced common channel or the common channel in use and transmitting the assigned data to the given mobile station for an active period in the idle frame, the eighth step (S40) of transmitting data to the given mobile station over a dedicated channel if it is determined at the above sixth step that the transmission frame is not the idle frame, the ninth step (S41) of determining whether the handover has been completed, after performing the above seventh or eighth step, and the tenth step (S42) of discontinuing the call to the given mobile station if it is determined at the above ninth step that the handover has been completed. The data transmission method of the base station further comprises the eleventh step (S43) of determining whether there is present a different mobile station associated with the produced common channel or the common channel in use, after discontinuing the call to the given mobile station, the twelfth step (S44) of releasing the produced common channel or the common channel in use if it is determined at the above eleventh step that there is not present any mobile station associated with the produced common channel or the common channel in use and only radio resources assigned to the given mobile station if it is determined at the above eleventh step that there is present the different mobile station associated with the produced common channel or the common channel in use, the thirteenth step (S45) of advancing a compressed mode operation of the different mobile station after performing the above twelfth step, and the fourteenth step (S46) of returning to the above tenth step to discontinue a call to the different mobile station, if handover of the different mobile station is completed during the compressed mode operation thereof.

A detailed description will hereinafter be given of the above-mentioned method where the base station transmits data for the inter-frequency (inter-system) handover using only the common channel in accordance with the second embodiment of the present invention.

First, the base station establishes a call to a given mobile station at step S31 and then transmits and receives data to/from the given mobile station over a dedicated channel at step S32.

Thereafter, the base station checks the current state of the given mobile station performing the data communication therewith at step S33 to determine whether the inter-frequency (inter-system) handover is requested. If the inter-frequency (inter-system) handover is requested at step S33, then the base station determines at step S34 whether a common channel in use is present. In the case where it is determined at the above step S34 that no common channel in use is present, namely, the given mobile station is an initial one entering a compressed mode in the base station, then the base station assigns an OVSF code with half an SF used in the above dedicated channel to produce a common channel corresponding to ½ an SF of the given mobile station and advances the compressed mode according to the produced common channel at step S36. Then, the base station transmits information about the produced common channel to the given mobile station at step S37.

If it is determined at the above step S34 that the common channel in use is present, namely, it is being used by a different mobile station in the compressed mode, then the base station determines at step S35 whether the common channel in use is divided and available for the given mobile station. In the case where the common channel in use is not available for the given mobile station at step S35, the base station proceeds to the above step S36 to produce the common channel corresponding to ½ the SF of the given mobile station and then to the above step S37 to transmit information about the produced common channel to the given mobile station.

If the common channel in use is available for the given mobile station at the above step S35, the base station assigns and uses a sub-tree code of an OVSF code assigned to that common channel and then shifts to the above step S37 to transmit information about that common channel to the given mobile station.

Here, the common channel information contains a start point (any one of 16 slots in one frame) and length of an idle period to be used by the given mobile station, which are appropriately determined in consideration of various situations in the base station.

After transmitting the common channel information to the given mobile station, the base station transmits data to that mobile station and meanwhile determines at step S38 whether a transmission frame is an idle frame. If the transmission frame is not the idle frame at step S38, then the base station transmits data to the given mobile station over the dedicated channel at step S40. However, in the case where the transmission frame is the idle frame at step S38, the base station assigns data corresponding to the idle frame to the produced common channel or the common channel in use and transmits the assigned data to the given mobile station for an active period in the idle frame at step S39.

After transmitting data to the given mobile station in the above manner, the base station determines at step S41 whether the handover has been completed. If the handover has been completed at step S41, then the base station discontinues the call to the given mobile station at step S42 and determines at step S43 whether there is present a different mobile station associated with the produced common channel or the common channel in use.

In the case where there is not present any mobile station associated with the produced common channel or the common channel in use at the above step S43, the base station releases the produced common channel or the common channel in use. To the contrary, if there is present the different mobile station associated with the produced common channel or the common channel in use at the above step S43, the base station releases only radio resources assigned to the given mobile station at step S44. Subsequently, the base station advances a compressed mode operation of the different mobile station at step S45 and determines at step S46 whether handover of the different mobile station has been completed during the compressed mode operation thereof. Then, the base station returns to the above step S42 if the handover of the different mobile station has been completed at step S46 and to the above step S45 if it has not been completed at step S46.

Figure 10:
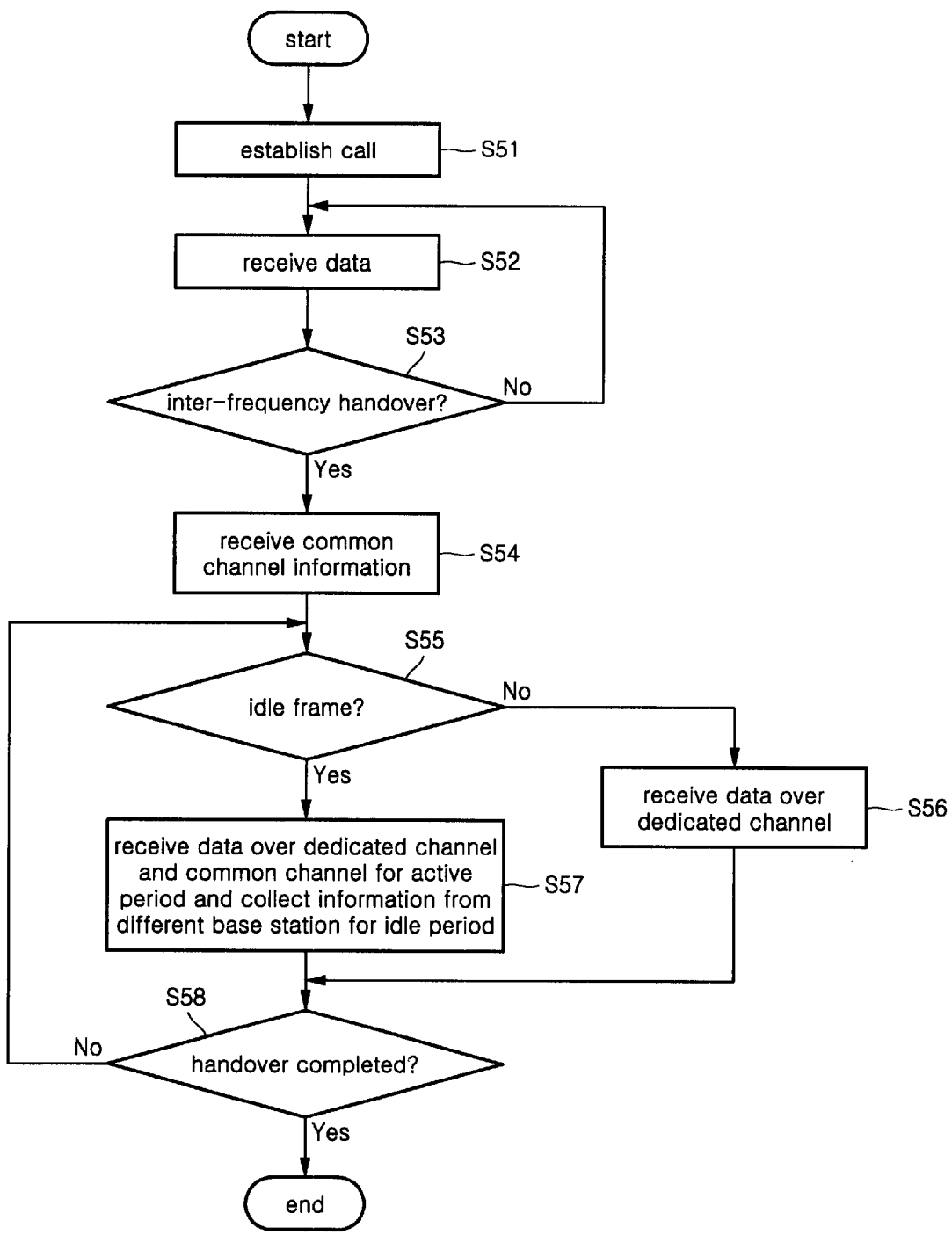
FIG. 10 is a flowchart illustrating a method where a mobile station receives data for inter-frequency (inter-system) handover using both the common channel and dedicated channel in accordance with the first embodiment of the present invention.

FIG. 10 is a flowchart illustrating a method where a mobile station receives data in a compressed mode over both a common channel and dedicated channel in accordance with the first embodiment of the present invention.

As shown in FIG. 10, the data reception method of the mobile station comprises the first step (S51 and S52) of establishing a call to a specific base station through a call establishing procedure and then receiving data from the specific base station over the dedicated channel, the second step (S53) of determining whether there is requested inter-frequency (inter-system) handover to a different base station with a different frequency during the data reception, and the third step (S54) of receiving information about the common channel from the specific base station if it is determined at the above second step that the inter-frequency handover is requested. The data reception method of the mobile station further comprises the fourth step (S55) of determining whether a received frame is an idle frame, the fifth step (S56) of receiving data from the specific base station over the dedicated channel if it is determined at the above fourth step that the received frame is not the idle frame, and the sixth step (S57) of, if it is determined at the above fourth step that the received frame is the idle frame, receiving data from the specific base station over the dedicated channel and common channel for an active period in the idle frame and collecting information from the different base station with the different frequency for an idle period in the idle frame. The data reception method of the mobile station further comprises the seventh step (S58) of determining whether the handover has been completed, after performing the above fifth or sixth step, returning to the above fourth step if the handover has not been completed and ending the above handover operation if the handover has been completed.

A detailed description will be given of the above-mentioned method where the mobile station receives data in the compressed mode over both the common channel and dedicated channel in accordance with the first embodiment of the present invention.

First, the mobile station establishes a call to a specific base station through the call establishing procedure at step S51 and then receives data from the specific base station over the dedicated channel at step S52.

The mobile station determines at step S53 whether there is requested inter-frequency handover to a different base station with a different frequency during the data reception. If the inter-frequency handover is requested at step S53, then the mobile station receives information about the common channel from the specific base station at step S54. Here, the common channel information contains a start point and length of an idle period in the common channel to be used by the mobile station.

Upon receiving the common channel information from the specific base station, the mobile station requesting the inter-frequency handover retrieves a received frame at step S55 to determine whether it is an idle frame. If the received frame is not the idle frame at step S55, the mobile station receives data from the specific base station over the dedicated channel at step S56.

In the case where it is determined at the above step S55 that the received frame is the idle frame, the mobile station receives data from the specific base station over the dedicated channel and common channel for an active period in the idle frame and collects information from the base station with the different frequency for an idle period in the idle frame.

Noticeably, information incapable of being transmitted for the idle period can be transmitted over the common channel for the active period. That is, an appropriate OVSF code is produced and information incapable of being transmitted for the idle period is transmitted to a mobile station over the common channel for the active period on the basis of the produced OVSF code. Therefore, in the case where a plurality of mobile stations request inter-frequency handover, an associated base station can assign non-overlap portions of the common channel respectively to the mobile stations and transmit information respectively to the mobile stations using one OVSF code, thus preventing a degradation in QoS due to non-orthogonality, and power consumption.

Thereafter, the mobile station determines at step S58 whether the handover has been completed. Then, the mobile station returns to the above step S55 if the handover has not been completed at step S58 and ends the above handover operation if the handover has been completed at step S58.

Figure 11:
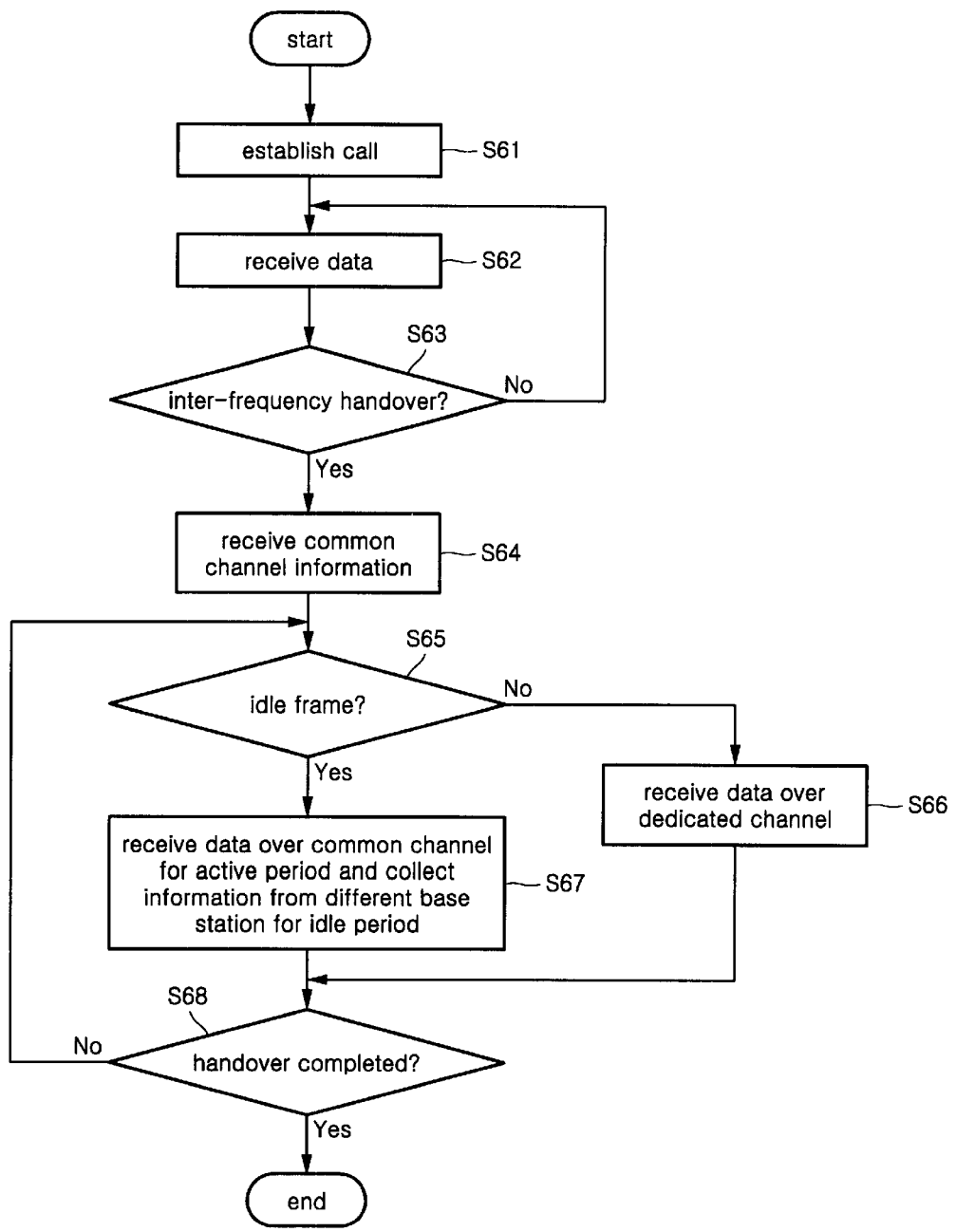
FIG. 11 is a flowchart illustrating a method where a mobile station receives data for inter-frequency (inter-system) handover using only the common channel in accordance with the second embodiment of the present invention.

FIG. 11 is a flowchart illustrating a method where a mobile station receives data in a compressed mode over only a common channel in accordance with the second embodiment of the present invention.

As shown in FIG. 11, the data reception method of the mobile station comprises the first step (S61 and S62) of establishing a call to a specific base station through a call establishing procedure and then receiving data from the specific base station over a dedicated channel, the second step (S63) of determining whether there is requested inter-frequency (inter-system) handover to a different base station with a different frequency during the data reception, and the third step (S64) of receiving information about the common channel from the specific base station if it is determined at the above second step that the inter-frequency handover is requested. The data reception method of the mobile station further comprises the fourth step (S65) of determining whether a received frame is an idle frame, the fifth step (S66) of receiving data from the specific base station over the dedicated channel if it is determined at the above fourth step that the received frame is not the idle frame, the sixth step (S67) of, if it is determined at the above fourth step that the received frame is the idle frame, receiving data from the specific base station over the common channel for an active period in the idle frame and collecting information from the different base station with the different frequency for an idle period in the idle frame, and the seventh step (S68) of determining whether the handover has been completed, after performing the above fifth or sixth step, returning to the above fourth step if the handover has not been completed and ending the above handover operation if the handover has been completed.

A detailed description will be given of the above-mentioned method where the mobile station receives data in the compressed mode over only the common channel in accordance with the second embodiment of the present invention.

First, the mobile station establishes a call to a specific base station through the call establishing procedure at step S61 and then receives data from the specific base station over the dedicated channel at step S62.

Subsequently, the mobile station determines at step S63 whether there is requested inter-frequency handover to a different base station with a different frequency during the data reception. In the case where the inter-frequency handover is requested at step S63, the mobile station receives information about the common channel from the specific base station at step S64. Here, the common channel information contains a start point and length of an idle period in the common channel to be used by the mobile station.

If the mobile station requesting the inter-frequency handover is assigned with the common channel by the specific base station in the above manner, then it retrieves a received frame at step S65 to determine whether it is an idle frame. In the case where the received frame is not the idle frame at step S65, the mobile station receives data from the specific base station over the dedicated channel at step S66.

In the case where it is determined at the above step S65 that the received frame is the idle frame, the mobile station receives data from the specific base station over the common channel for an active period in the idle frame and collects information from the different base station with the different frequency for an idle period in the idle frame.

Noticeably, a base station can transmit information, not transmitted for the idle period, over the common channel for the active period. That is, the base station produces an appropriate scrambling code using a given OVSF code and transmits information, not transmitted for the idle period, to a mobile station over the common channel for the active period on the basis of the produced scrambling code. Therefore, in the case where a plurality of mobile stations request inter-frequency handover, the base station can assign non-overlap portions of the common channel respectively to the mobile stations and transmit information respectively to the mobile stations using one OVSF code, thus preventing a degradation in QoS due to non-orthogonality, and power consumption.

Thereafter, the mobile station determines at step S68 whether the handover has been completed. Then, the mobile station returns to the above step S65 if the handover has not been completed at step S68 and ends the above handover operation if the handover has been completed at step S68.

As apparent from the above description, according to the present invention, a base station transmits information to a mobile station using a newly produced common channel assigned with a predetermined constant spreading factor, thereby overcoming a conventional code shortage problem.

Further, the assignment of one OVSF code to a common channel can keep orthogonality with other channels. Moreover, a base station previously determines a portion of the common channel useable by a mobile station to designate the mobile station. Therefore, even in the case where mobile stations entering a compressed mode are increased in number, the base station can stably transmit data to the mobile stations for inter-frequency handover without assigning additional codes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for allowing a specific base station to transmit data to a mobile station connected thereto in a mobile telecommunications system when said mobile station attempts inter-frequency (inter-system) handover to a different base station with a different frequency or communication system, comprising the steps of:

a) assigning a common channel to said mobile station if said inter-frequency (inter-system) handover is requested by said mobile station and transmitting information about the assigned common channel to said mobile station;

b) determining whether a transmission frame is an idle frame and transmitting data to said mobile station over a dedicated channel if said transmission frame is not the idle frame and over both said dedicated channel and common channel if said transmission frame is the idle frame; and c) determining whether said handover has been completed by said mobile station and controlling a call and resources assigned to said mobile station in accordance with the determined result.

2. The method as set forth in claim 1, wherein said step a) includes the steps of:

a-1) establishing said call to said mobile station through a call establishing procedure, assigning said dedicated channel to said mobile station and transmitting data to said mobile station over said dedicated channel;

a-2) recognizing through an upper protocol message exchange procedure that said mobile station requests said inter-frequency handover to said different base station with the different frequency;

a-3) determining whether a common channel in use is present, upon recognizing that said inter-frequency handover is requested;

a-4) producing a common channel corresponding to a spreading factor of said mobile station if it is determined at said step a-3) that no common channel in use is present and transmitting information about the produced common channel to said mobile station;

a-5) determining whether the common channel in use is divided and available for said mobile station, if it is determined at said step a-3) that the common channel in use is present, and transmitting information about said common channel in use to said mobile station if it is available for said mobile station; and a-6) producing said common channel corresponding to said spreading factor of said mobile station if it is determined at said step a-5) that said common channel in use is not available for said mobile station and transmitting the information about the produced common channel to said mobile station.

3. The method as set forth in claim 1, wherein said common channel information contains a start point and length of an idle period in said common channel to be used by said mobile station.

4. The method as set forth in claim 1, wherein said step b) includes the steps of:

b-1) determining whether said transmission frame is the idle frame;

b-2) transmitting data to said mobile station over said dedicated channel if it is determined at said step b-1) that said transmission frame is not the idle frame; and b-3), if it is determined at said step b-1) that said transmission frame is the idle frame, assigning data for an idle period in said idle frame to said common channel, transmitting the assigned data to said mobile station for an active period in said idle frame, transmitting the remaining data in said idle frame to said mobile station over said dedicated channel for said active period and transmitting no data to said mobile station for said idle period.

5. The method as set forth in claim 1, wherein said step c) includes the steps of:

c-1) determining whether said handover has been completed by said mobile station;

c-2) discontinuing said call to said mobile station if it is determined at said step c-1) that said handover has been completed;

c-3) determining whether there is present a different mobile station associated with said common channel;

c-4) releasing said common channel if it is determined at said step c-3) that there is not present any mobile station associated with said common channel and only said radio resources assigned to said mobile station completing said handoff if it is determined at said step c-3) that there is present the different mobile station associated with said common channel;

c-5) advancing a compressed mode operation of said different mobile station; and c-6) determining whether handover of said different mobile station has been completed and returning to said step c-2) to discontinue a call to said different mobile station, if the handover of said different mobile station has been completed, and to said step c-5) to advance said compressed mode operation of said different mobile station, if the handover of said different mobile station has not been completed.

6. A method for allowing a specific base station to transmit data to a mobile station connected thereto in a mobile telecommunications system when said mobile station attempts inter-frequency (inter-system) handover to a different base station with a different frequency or communication system, comprising the steps of:

a) assigning a common channel to said mobile station if said inter-frequency (inter-system) handover is requested by said mobile station and transmitting information about the assigned common channel to said mobile station;

b) determining whether a transmission frame is an idle frame and transmitting data to said mobile station over a dedicated channel if said transmission frame is not the idle frame and over only said common channel if said transmission frame is the idle frame; and c) determining whether said handover has been completed by said mobile station and controlling a call and resources assigned to said mobile station in accordance with the determined result.

7. The method as set forth in claim 6, wherein said step a) includes the steps of:

a-1) establishing said call to said mobile station through a call establishing procedure, assigning said dedicated channel to said mobile station and transmitting data to said mobile station over said dedicated channel;

a-2) recognizing through an upper protocol message exchange procedure that said mobile station requests said inter-frequency handover to said different base station with the different frequency;

a-3) determining whether a common channel in use is present, upon recognizing that said inter-frequency handover is requested;

a-4) producing a common channel corresponding to ½ a spreading factor of said mobile station if it is determined at said step a-3) that no common channel in use is present and transmitting information about the produced common channel to said mobile station;

a-5) determining whether the common channel in use is divided and available for said mobile station, if it is determined at said step a-3) that the common channel in use is present, and transmitting information about said common channel in use to said mobile station if it is available for said mobile station; and a-6) producing said common channel corresponding to ½ said spreading factor of said mobile station if it is determined at said step a-5) that said common channel in use is not available for said mobile station and transmitting the information about the produced common channel to said mobile station.

8. The method as set forth in claim 6, wherein said common channel information contains a start point and length of an idle period in said common channel to be used by said mobile station.

9. The method as set forth in claim 6, wherein said step b) includes the steps of:
   b-1) determining whether said transmission frame is the idle frame;
   b-2) transmitting data to said mobile station over said dedicated channel if it is determined at said step b-1) that said transmission frame is not the idle frame; and
   b-3), if it is determined at said step b-1) that said transmission frame is the idle frame, assigning data corresponding to said idle frame to said common channel, transmitting the assigned data to said mobile station for an active period in said idle frame and transmitting no data to said mobile station for an idle period in said idle frame.

10. The method as set forth in claim 6, wherein said step c) includes the steps of:
    c-1) determining whether said handover has been completed by said mobile station;
    c-2) discontinuing said call to said mobile station if it is determined at said step c-1) that said handover has been completed;
    c-3) determining whether there is present a different mobile station associated with said common channel;
    c-4) releasing said common channel if it is determined at said step c-3) that there is not present any mobile station associated with said common channel and only said radio resources assigned to said mobile station completing said handoff if it is determined at said step c-3) that there is present the different mobile station associated with said common channel;
    c-5) advancing a compressed mode operation of said different mobile station; and
    c-6) determining whether handover of said different mobile station has been completed and returning to said step c-2) to discontinue a call to said different mobile station, if the handover of said different mobile station has been completed, and to said step c-5) to advance said compressed mode operation of said different mobile station, if the handover of said different mobile station has not been completed.

11. A method for allowing a mobile station to receive data from a specific base station connected thereto in a mobile telecommunications system when said mobile station attempts inter-frequency (inter-system) handover to a different base station with a different frequency or communication system, comprising the steps of:
    a) establishing a call to said specific base station, receiving data from said specific base station over a dedicated channel and receiving information about a common channel from said specific base station over said dedicated channel upon requesting said inter-frequency handover; and
    b) determining whether a received frame is an idle frame and receiving data from said specific base station over said dedicated channel if said received frame is not the idle frame and over both said common channel and dedicated channel for an active period in the idle frame if said received frame is the idle frame.

12. The method as set forth in claim 11, wherein said common channel information contains a start point and length of an idle period in said common channel to be used by said mobile station.

13. The method as set forth in claim 11, wherein said step b) includes the steps of:
    b-1) determining whether said received frame is the idle frame;
    b-2) receiving data from said specific base station over said dedicated channel if it is determined at said step b-1) that said received frame is not the idle frame; and
    b-3), if it is determined at said step b-1) that said received frame is the idle frame, receiving data from said specific base station over both said common channel and dedicated channel for said active period in said idle frame and collecting information from said different base station for an idle period in said idle frame.

14. A method for allowing a mobile station to receive data from a specific base station connected thereto in a mobile telecommunications system when said mobile station attempts inter-frequency (inter-system) handover to a different base station with a different frequency or communication system, comprising the steps of:
    a) establishing a call to said specific base station, receiving data from said specific base station over a dedicated channel and receiving information about a common channel from said specific base station over said dedicated channel upon requesting said inter-frequency handover; and
    b) determining whether a received frame is an idle frame and receiving data from said specific base station over said dedicated channel if said received frame is not the idle frame and over only said common channel for an active period in the idle frame if said received frame is the idle frame.

15. The method as set forth in claim 14, wherein said common channel information contains a start point and length of an idle period in said common channel to be used by said mobile station.

16. The method as set forth in claim 14, wherein said step b) includes the steps of:
    b-1) determining whether said received frame is the idle frame;
    b-2) receiving data from said specific base station over said dedicated channel if it is determined at said step b-1) that said received frame is not the idle frame; and
    b-3), if it is determined at said step b-1) that said received frame is the idle frame, receiving data from said specific base station over only said common channel for said active period in said idle frame and collecting information from said different base station for an idle period in said idle frame.

* * * * *